United States Patent
Tsunekawa et al.

(10) Patent No.: US 9,097,844 B2
(45) Date of Patent: Aug. 4, 2015

(54) OPTICAL LAYERED BODY, POLARIZER, AND IMAGE DISPLAY DEVICE

(75) Inventors: Masayuki Tsunekawa, Tokyo (JP); Kana Yamamoto, Tokyo (JP); Toshiki Iwasaki, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 283 days.

(21) Appl. No.: 13/819,270

(22) PCT Filed: Aug. 23, 2011

(86) PCT No.: PCT/JP2011/068929
§ 371 (c)(1),
(2), (4) Date: May 13, 2013

(87) PCT Pub. No.: WO2012/026446
PCT Pub. Date: Mar. 1, 2012

(65) Prior Publication Data
US 2013/0222906 A1   Aug. 29, 2013

(30) Foreign Application Priority Data
Aug. 27, 2010   (JP) .................................. 2010-191194

(51) Int. Cl.
*G02B 27/28* (2006.01)
*G02B 1/10* (2015.01)
*G02B 5/30* (2006.01)
*G02B 1/118* (2015.01)

(52) U.S. Cl.
CPC ........ *G02B 1/10* (2013.01); *G02B 1/118* (2013.01); *G02B 5/30* (2013.01); *G02B 5/3041* (2013.01); *Y10T 428/24355* (2015.01)

(58) Field of Classification Search
CPC ............ G02B 1/10; G02B 1/118; G02B 5/20; G02B 5/3041; Y10T 428/24355
USPC ....................................................... 359/483.01
See application file for complete search history.

(56) References Cited

U.S. PATENT DOCUMENTS

2010/0104858 A1 * 4/2010 Horio et al. ................... 428/331
2010/0165460 A1    7/2010 Furui et al.

FOREIGN PATENT DOCUMENTS

| CN | 100397099 C | 6/2008 |
|---|---|---|
| CN | 101506693 A | 8/2009 |
| CN | 101551474 A | 10/2009 |
| JP | 2004-085925 A | 3/2004 |
| JP | 2004-191952 A | 7/2004 |
| JP | 2005-017707 A | 1/2005 |
| JP | 2008-158023 A | 7/2008 |
| JP | 2010-060643 A | 3/2010 |
| JP | 2010-131771 A | 6/2010 |
| JP | 2010132895 A * | 6/2010 |
| WO | WO-2004/049018 A1 | 6/2004 |
| WO | WO-2008/020613 A1 | 2/2008 |

* cited by examiner

*Primary Examiner* — Thao T Tran
(74) *Attorney, Agent, or Firm* — Novak Druce Connolly Bove + Quigg LLP

(57) ABSTRACT

Provided is an optical layered body having excellent blocking resistance. The optical layered body includes a triacetyl cellulose substrate and a hard coat layer, the hard coat layer having fine surface roughness that has an average PV roughness Rtm of 2.2 to 11.5 nm, a base roughness depth R3z of 2.5 to 13.5 nm, and a ten-point average roughness Rz of 2.6 to 13.5 nm, and satisfy the relation $Rtm<R3z \leq Rz$.

20 Claims, 1 Drawing Sheet

OPTICAL LAYERED BODY, POLARIZER, AND IMAGE DISPLAY DEVICE

CROSS REFERENCE TO RELATED APPLICATIONS

This application is a National Phase filing under 35 U.S.C. §371 of PCT/JP2011/068929 filed on Aug. 23, 2011; and this application claims priority to Application No. 2010-191194 filed in Japan on Aug. 27, 2010, under 35 U.S.C. §119; the entire contents of all are hereby incorporated by reference.

TECHNICAL FIELD

The present invention relates to an optical layered body, a polarizer, and an image display device.

BACKGROUND ART

Image display devices such as cathode ray tube (CRT) displays, liquid crystal displays (LCDs), plasma displays (PDPs), electroluminescence displays (ELDs), field emission displays (FEDs), touch panels, electronic paper, and tablet PCs have, on their outermost surface, an optical layered body formed from a functional layer that has various properties including an anti-glare property, an anti-reflection property, and an antistatic property.

Conventionally known optical layered bodies include ones in each of which a hard coat layer is formed on a transparent substrate that is made of a material such as triacetyl cellulose. The hard coat layer is typically formed by applying a coating liquid containing polyfunctional monomers to a transparent substrate; and curing the dried coating film by UV irradiation, as described in, for example, Patent Literatures 1 and 2.

Those optical layered bodies may be rolled or stacked on another optical layered body in the production process. The optical layered bodies, however, easily stick to each other because their hard coat layers are made of a plastic material such as an acrylic resin. Because of this nature, the optical layered bodies are not easily separated from each other when rolled or subjected to another treatment in the production process, i.e., they exhibit a phenomenon called blocking. Blocking may change the shape of the optical layered bodies or leave trace of sticking on the optical layered bodies, and thus causes a problem of a productivity decrease.

Also, an optical layered body may have a protective film on its hard coat layer, and may be irradiated with strong ultraviolet light through the protective film when processed to form a polarizer. Some protective films include a portion with markings such as process-control lot numbers. Such a portion with markings changes the amount of UV light reaching the hard coat layer, compared to portions without markings. The different amounts of UV light cause unreacted monomers remaining in the hard coat layer to be reacted differently to lead to different levels of cross-linked curing shrinkage between the portion with markings and the portions without markings. The different levels of cross-linked curing shrinkage result in a problem that the marking leaves trace of itself on the surface of the hard coat layer.

CITATION LIST

Patent Literature

Patent Literature 1: JP 2010-131771 A (Japanese Kokai Publication 2010-131771)

Patent Literature 2: JP 2010-060643 A (Japanese Kokai Publication 2010-060643)

SUMMARY OF INVENTION

Technical Problem

In view of the above current state of the art, the present invention aims to provide an optical layered body that is excellent in blocking resistance, marking trace resistance, and transparency.

Solution to Problem

One aspect of the present invention is an optical layered body comprising
a triacetyl cellulose substrate and
a hard coat layer,
wherein the hard coat layer has fine surface roughness
the fine surface roughness has an average PV roughness Rtm of 2.2 to 11.5 nm, a base roughness depth R3z of 2.5 to 13.5 nm, and a ten-point mean roughness Rz of 2.6 to 13.5 nm, and satisfies the relation Rtm<R3≤Rz.

Preferably, the hard coat layer contains a lubricant, and the fine roughness of the hard coat layer are shaped by the lubricant.

The lubricant is preferably at least one selected from the group consisting of silica particles and styrene-acrylic particles.

Preferably, the hard coat layer is a cured product of a hard coat layer composition that contains a (meth)acrylic polymer, a polyfunctional monomer, and a lubricant, and
the (meth)acrylic polymer has an acryloyl side chain, and has a hydroxyl value in a solids content of 150 or lower.

The (meth)acrylic polymer preferably has a weight average molecular weight of 10,000 to 30,000, and has an acrylic double bond equivalent of 300 or less.

The polyfunctional monomer is preferably pentaerythritol tri(meth)acrylate.

The hard coat layer composition preferably has a solid content ratio by mass of the (meth)acrylic polymer to the functional monomer of 1/9 to 3/7.

Another aspect of the present invention is a polarizer comprising a polarizing element and the optical layered body which is arranged on a surface of the polarizing element.

Yet another aspect of the present invention is an image display device comprising the optical layered described above, or the polarizer described above on an outermost surface thereof.

Hereinafter, the present invention is described in detail.

The optical layered body of the present invention has a hard coat layer having specific fine surface roughness on a triacetyl cellulose substrate. The optical layered body of the present invention is therefore excellent in blocking resistance, marking trace resistance, and transparency.

The optical layered body of the present invention includes a triacetyl cellulose substrate and a hard coat layer.

The triacetyl cellulose substrate has smoothness and heat resistance, and has excellent mechanical strength. Also, the substrate has no birefringence, and has excellent transparency.

The triacetyl cellulose substrate preferably has a thickness of 20 to 200 μm, and more preferably has a thickness of 30 to 100 μm.

Before a hard coat layer is formed on the triacetyl cellulose substrate, the substrate may be subjected to a physical treatment such as corona discharge treatment and oxidation treatment, and may be coated with a coating material called an anchoring agent or primer, for improvement of adhesion.

The optical layered body of the present invention includes a hard coat layer.

The hard coat layer has fine surface roughness.

The fine surface roughness has an average PV roughness Rtm of 2.2 to 11.5 nm, a base roughness depth R3z of 2.5 to 13.5 nm, and a ten-point mean roughness Rz of 2.6 to 13.5 nm, and satisfy the relation Rtm<R3z≤Rz.

The hard coat layer having such specific fine roughness can prevent blocking of the optical layered body of the present invention. Such an optical layered body, when applied to an image display device, contributes to images with very high sharpness, completely prevents cloudiness that can be caused by an anti-glare hard coat, and shows favorable optical properties.

The Rtm represents average peak-to-valley (PV) roughness. Specifically, the Rtm is a value obtained by dividing the surface into nine areas, and averaging the PV heights (maximum heights) for the respective divided areas. The PV heights (maximum heights) each are, as illustrated in FIG. 1, a difference between the highest peak and the lowest valley in the reference length.

The Rz represents ten-point average roughness that can be determined by the method in accordance with JIS B 0601 (1994). Specifically, the Rz represents, as illustrated in FIG. 2, the average of the absolute values of the heights from the five peaks (P1 to P5) to the five valleys (V1 to V5) in the reference length.

The R3z represents base roughness depth that is obtained by, as illustrated in FIG. 3, determining a height 3zi from the third highest peak to the third lowest valley of each base length lr in a reference length In (normally n=5), and averaging the obtained heights 3zi's (see the formula (1)).

[Math 1]

$$R3z = \frac{1}{n}\sum_{i=1}^{n} 3zi \quad \text{Formula (1)}$$

Specifically, the Rtm, Rz, and R3z are values determined through the following measurement using a non-contact surface measurement system (product of Zygo Corporation).

That is, each optical layered body is placed on a glass plate, and the surface of the hard coat layer is observed with a 10× zoom lens at a zoom factor of 2. Then, the Rtm, Rz, and R3z can be determined from the Roughness/Waviness Map in the Advanced Texture Application of the non-contact surface measurement system.

More specifically, the application AdvText.App is run using the analysis software MetroPro 8.3.2 on the non-contact surface measurement system (NewView 6300 from Zygo Corporation). The optical layered body is placed on a glass plate, the interference fringe is adjusted for observation of the surface of the hard coat layer using a 10× zoom lens at a zoom factor of 2, and the "Measure" button is pressed. The result obtained thereby is adopted. Here, the result obtained is the value displayed on the Roughness Filled Plot.

Preferably, the hard coat layer contains a lubricant, and the fine roughness of the hard coat layer are shaped by the lubricant.

The lubricant provides lubricity to the surface of the hard coat layer, and prevents blocking in a suitable manner.

Examples of the lubricant include silica particles, styrene particles, and styrene-acrylic particles. Particularly, the lubricant is preferably at least one selected from the group consisting of silica particles and styrene-acrylic particles, in terms of compatibility with the resin for concentrating the lubricant at the surface of the hard coat layer. The lubricant is most preferably silica.

The lubricant preferably has an average particle size of 100 to 600 nm. An average particle size of smaller than 100 nm may not sufficiently prevent blocking. An average particle size of greater than 600 nm may increase the haze, making the hard coat layer white. The average particle size is more preferably 150 to 350 nm.

The average particle size is a value obtained by measuring the particles in a 5% by mass dispersion in methyl isobutyl ketone by observation with a laser diffraction particle size distribution analyzer or SEM.

The amount of the lubricant is preferably 0.5 to 3 parts by mass for each 100 parts by mass of the binder resin in the hard coat layer composition.

An amount of less than 0.5 parts by mass may not achieve the desired lubricity. An amount of more than 3 parts by mass may decrease the dispersibility to cause aggregation or gellation, increasing the haze of the hard coat layer to be formed.

The amount of the lubricant is more preferably 1 to 2.5 parts by mass.

The hard coat layer is preferably a cured product of a hard coat layer composition that contains a (meth)acrylic polymer and a polyfunctional monomer as well as the lubricant.

The (meth)acrylic polymer and the polyfunctional monomer are contained in the hard coat layer composition as binder resins.

Since the hard coat layer of the optical layered body of the present invention is a cured product of a hard coat layer composition that contains specific resins as the binder resins as well as the lubricant, the optical layered body can have the above specific fine roughness formed in a suitable manner, achieve excellent blocking resistance, and prevent curling and damage. Actually, in the case of using a hard coat layer composition containing a binder resin with a high hydroxyl value, the high hydroxyl value of the binder resin attracts the lubricant (silica particles), which disables control of the surface shape of the hard coat layer to be formed. As a result, the optical layered body cannot achieve the blocking resistance. Decreasing the hydroxyl value of the binder resin decreases the compatibility between the binder resin and the lubricant (silica particles). Consequently, the lubricant (silica particles) is concentrated near the surface of the hard coat layer, and the desired fine roughness are formed. Thereby, the blocking resistance can be achieved.

The curling mentioned above refers to a warp of the, entire optical layered body. The warp occurs when the cross-linked curing shrinkage of the binder resin is promoted in formation of the hard coat layer through ultraviolet irradiation, and thereby a stress difference is produced between the hard coat layer and the substrate. The damage mentioned above refers to the phenomenon in which the hard coat layer and the substrate are deformed into wavy stripes in the flow direction. The phenomenon is caused by quenching of the hard coat layer after the coating film is cured through an exothermic reaction by strong UV irradiation, which involves cross-linked curing shrinkage of the hard coat layer.

Use of the later-described (meth)acrylic polymer having an acryloyl side chain as the above (meth)acrylic polymer enables to prevent the curling and damage. This is because the (meth)acrylic polymer is reacted by the ultraviolet irradiation, but does not cause exothermic reaction or cross-linked curing shrinkage as easily as polyfunctional monomers.

The optical layered body of the present invention can also prevent trace of a marking.

The optical layered body may also have a protective film on its hard coat layer, and may be irradiated with strong UV light through the protective film when processed to form a polarizer. Some protective films include a portion with markings such as process-control lot numbers. Such a portion with markings changes the amount of UV light reaching the hard coat layer, compared to portions without markings. Accordingly, unreacted monomers remaining in the hard coat layer cause different levels of cross-linked curing shrinkage between the portion with markings and the portions without markings. The different levels of cross-linked curing shrinkage result in a problem that the marking leaves trace of itself on the surface of the hard coat layer.

The optical layered body of the present invention, having a hard coat layer formed using the above-mentioned specific resin, can prevent such trace of a marking.

The (meth)acrylic polymer preferably has an acryloyl side chain.

The acryloyl side chain enables to prevent curling and damage in formation of the hard coat layer, giving the desired pencil hardness and abrasion resistance to the hard coat layer.

One of the methods of adding an acryloyl group to the main skeleton of the acrylic resin is a method of reacting the carboxyl group and an epoxy to introduce an acryloyl side chain to the acrylic main chain. Here, the reaction between the carboxyl group and an epoxy is bound to produce a hydroxyl group.

A large amount of hydroxyl groups in the (meth)acrylic polymer improves the compatibility with a lubricant such as silica particles, and therefore evenly distributes the lubricant in the resin. As a result, a problem arises in which the optical layered body sticks to its backside when rolled in the production process. The present inventors have made intensive studies in view of the above problem, and have found that decreasing the amount of the hydroxyl groups in the side chains of the (meth)acrylic polymer prevents uniform distribution of the lubricant in the resin, thereby preventing sticking of the optical layered body.

One of the methods of decreasing the amount of hydroxyl groups in the (meth)acrylic polymer is a method of reacting the hydroxyl groups with acid anhydride to produce carboxyl groups.

The (meth)acrylic polymer containing carboxyl groups, however, bonds to the lubricant to incorporate the lubricant into the resin, inhibiting the lubricant from exhibiting its lubricity.

For this reason, the present invention preferably employs a (meth)acrylic polymer obtained by reacting the hydroxyl groups of the above (meth)acrylic polymer and isocyanate groups to form urethane bonds, thereby decreasing the amount of hydroxyl groups. In this case, a small amount of the lubricant enables the optical layered body to favorably achieve the blocking resistance and, at the same time, prevents a decrease in the optical properties.

The isocyanate-containing reaction component is preferably an isocyanate-containing (meth)acrylate monomer, and more preferably an isocyanate-containing methacrylate monomer.

For sure achievement of the above function, the (meth) acrylic polymer preferably has a hydroxyl value in a solids content of 150 or lower. A hydroxyl value in a solids content of more than 150 may cause the polymer to attract the lubricant to lead to insufficient control of the surface shape of the hard coat layer, so that sufficient blocking resistance may not be achieved.

The hydroxyl value in a solids content is more preferably 100 or lower, and still more preferably 90 or lower.

The hydroxyl value in a solids content is a value determined from the hydroxyl value and the weight average molecular weight calculated using the monomer added.

The (meth)acrylic polymer preferably has a weight average molecular weight of 10,000 to 30,000.

A weight average molecular weight of less than 10,000 may decrease the pencil hardness. A weight average molecular weight of more than 30,000 may decrease the adhesion of the coating film, increase the viscosity of the hard coat layer composition, which deteriorates the coating surface, and decrease the handleability. The maximum weight average molecular weight is more preferably 20,000.

The weight average molecular weight is a value obtained from polystyrene conversion by the gel permeation chromatography (GPC) method.

The (meth)acrylic polymer preferably has an acrylic double bond equivalent of 200 to 300. An acrylic double bond equivalent of less than 200 may bring difficulties in synthesis, and may decrease Tg. An acrylic double bond equivalent of more than 300 may lead to a small amount of double bonds, decreasing the pencil hardness and abrasion resistance of the hard coat layer to be obtained.

The maximum acrylic double bond equivalent is more preferably 250.

The acrylic double bond equivalent is a value determined from the amount of double bonds and the weight average molecular weight calculated using the monomer added.

The (meth)acrylic polymer preferably has a glass transition temperature (Tg) of 40° C. to 80° C. A glass transition temperature of lower than 40° C. may cause the pencil hardness and abrasion resistance to be insufficient. A glass transition temperature of more than 80° C. may increase the viscosity of the hard coat layer composition, and make the composition into a gel. The glass transition temperature is more preferably 50° C. to 70° C.

The glass transition temperature is a value obtained by the calculation method using Tg of the monomers constituting the polymer.

The (meth)acrylic polymer preferably has an acid value of 1 mgKOH/g or lower. An acid value of higher than 1 mgKOH/g may result in trace of a marking and failing of production of a hard coat layer that has the desired pencil hardness and abrasion resistance.

The acid value is more preferably 0.8 mgKOH/g or lower.

The amount of the (meth)acrylic polymer as the solids content in the binder resin of the hard coat layer composition is preferably 10 to 30% by mass. An amount of less than 10% by mass may not enable prevention of trace of a marking. An amount of more than 30% by mass may decrease the pencil hardness and abrasion resistance of the hard coat layer. The amount of the (meth)acrylic polymer as the solids content is more preferably 10 to 20% by mass.

The hard coat layer composition preferably further contains a polyfunctional monomer as the binder resin.

A polyfunctional monomer together with the (meth)acrylic polymer enables to form an optical layered body excellent in pencil hardness, abrasion resistance, and optical properties. The hard coat layer composition also can prevent trace of the marking.

Examples of the polyfunctional monomer include pentaerythritol tri(meth)acrylate, dipentaerythritol hexa(meth)acrylate, pentaerythritol tetra(meth)acrylate, dipentaerythritol penta(meth)acrylate, trimethylolpropane tri(meth)acrylate, dipentaerythritol tetra(meth)acrylate, and isocyanuric acid EO-modified tri(meth)acrylate. Among these, pentaerythritol tri(meth)acrylate is preferred in terms of the most favorable balance between achievement of the pencil hardness and prevention of curling and damage.

The hard coat layer composition preferably has a solid content ratio by mass of the (meth)acrylic polymer to the functional monomer of 1/9 to 3/7. A mass ratio of less than 1/9 may result in insufficient prevention of curling, damage, and trace of a marking. A mass ratio of more than 3/7 may result in insufficient abrasion resistance and insufficient adhesion of the hard coat layer to the substrate. The mass ratio is more preferably 1/9 to 2/8.

The hard coat layer composition preferably further contains a photopolymerization initiator.

The photopolymerization initiator may be any known photopolymerization initiator. Examples of the known photopolymerization initiator include acetophenones (e.g., product name: IRGACURE 184, 1-hydroxy-cyclohexyl-phenyl-ketone from Ciba Specialty Chemicals; and product name: IRGACURE 907, 2-methyl-1[4-(methylthio)phenyl]-2-morpholinopropane-1-one from Ciba Specialty Chemicals), benzophenones, thioxanthones, benzoin, benzoin methyl ether, aromatic diazonium salts, aromatic sulfonium salts, aromatic iodonium salts, metallocene compounds, and benzoin sulfonate. Among these, acetophenones are preferred.

The amount of the photopolymerization initiator is preferably 1 to 7 parts by mass for each 100 parts by mass of the binder resin in the hard coat layer composition. An amount of the photopolymerization initiator of less than 1 part by mass may be insufficient, resulting in insufficient hardness. An amount of the photopolymerization initiator of more than 7 parts by mass may be excessive to lead to a residual photopolymerization initiator that may cause a problem of trace of a marking.

The amount of the photopolymerization initiator is preferably 2 to 5 parts by mass for each 100 parts by mass of the binder resin.

The hard coat layer composition preferably further contains a leveling agent.

The leveling agent can give favorable smoothness to a hard coat layer to be obtained.

Examples of the leveling agent include known leveling agents such as fluorine leveling agents, silicone leveling agents, and acrylic leveling agents. Among these, fluorine leveling agents are preferred because the amount to be added is small, and the smoothness of the coating film surface and the pot life of the coating liquid are favorable.

The amount of the leveling agent is preferably 0.1 to 1 part by mass for each 100 parts by mass of the binder resin in the hard coat layer composition. An amount of less than 0.1 parts by mass may deteriorate the smoothness of the coating film, increase the haze, cause uneven coating, and decrease the pot life. An amount of more than 1 part by mass may not achieve the desired dispersibility and smoothness of the hard coat layer composition.

The amount of the leveling agent is more preferably 0.1 to 0.5 parts by mass for each 100 parts by mass of the binder resin.

The hard coat layer may further optionally contain component(s) other than the above (meth)acrylic polymer, polyfunctional monomer, lubricant, photopolymerization initiator, and leveling agent. Examples of the other component(s), which should be components other than the above, include resins, heat polymerization initiators, ultraviolet absorbents, photostabilizers, crosslinking agents, curing agents, polymerization accelerators, viscosity controlling agents, antistatic agents, antioxidants, stain-proofing agents, slipping agents, refractive-index modifiers, and dispersants. These components may be known products.

The hard coat layer can be formed from a hard coat layer composition obtained by mixing and dispersing in a solvent the above-mentioned (meth)ang agcrylic polymer, polyfunctional monomer, lubricant, and optionally a photopolymerization initiator, levelient, and any other component.

The mixture dispersion may be favorably performed using a known device such as a paint shaker, a bead mill, and a kneader.

Examples of the solvent include alcohols (e.g., methanol, ethanol, propanol, isopropanol, n-butanol, s-butanol, t-butanol, benzyl alcohol, PGME, ethylene glycol), ketones (e.g., acetone, methyl ethyl ketone, methyl isobutyl ketone, cyclopentanone, cyclohexanone, heptanone, diisobutyl ketone, diethyl ketone), aliphatic hydrocarbons (e.g., hexane, cyclohexane), halogenated hydrocarbons (e.g., methylene chloride, chloroform, carbon tetrachloride), aromatic hydrocarbons (e.g., benzene, toluene, xylene), amides (e.g., dimethylformamide, dimethylacetamide, n-methyl pyrrolidone), ethers (e.g., diethylether, dioxane, tetrahydrofuran), and ether alcohols (e.g., 1-methoxy-2-propanol).

For simpler formation of a hard coat layer having the desired roughness, the solvent is preferably a combination of highly volatile solvents such as methyl ethyl ketone, acetone, and methyl acetate.

The hard coat layer composition preferably has a total solids content of 30 to 45%. A total solids content of lower than 30% may be more likely to leave a residual solvent. A total solids content of more than 45% may increase the viscosity of the hard coat layer composition, decreasing the coating properties.

The total solids content is more preferably 35 to 45%.

The hard coat layer can be formed by applying the hard coat layer composition to the substrate to form a coating film, optionally drying the coating film, and then curing the coating film.

Examples of the method of applying the hard coat layer composition to the substrate to form a coating film include various known methods such as spin coating, dipping, spraying, die coating, bar coating, roll coater coating, meniscus coater coating, flexographic printing, screen printing, and bead coater coating.

The drying method may be any drying method, and may typically be performed for 3 to 120 seconds at 30° C. to 120° C.

The method of curing the coating film may be a known method properly selected depending on the conditions such as the materials constituting the composition. For example, in the case that the composition is an ultraviolet curable composition, the coating film may be cured by ultraviolet irradiation.

In the case of the ultraviolet irradiation, the amount of UV irradiation is preferably 100 mJ/cm$^2$ or more, more preferably 150 mJ/cm$^2$ or more, and still more preferably 200 mJ/cm$^2$ or more.

The hard coat layer preferably has a thickness of 3 to 15 μm.

A thickness of smaller than 3 μm may decrease the pencil hardness and abrasion resistance. A thickness of greater than 15 μm tends to cause the hard coat layer to have a residual solvent, decreasing the adhesion of the coating film. The hard coat layer more preferably has a thickness of 4 μm to 10 μm.

The thickness is a value obtained by measuring the cross section of the hard coat layer by electron microscope (e.g., SEM, TEM, STEM) observation.

The optical layered body of the present invention preferably has a hardness of 2 H or higher, and more preferably 3 H or higher, in the pencil hardness test (load: 4.9 N) in accordance with JIS K5600-5-4 (1999).

The surface of the optical layered body of the present invention is preferably not peeled when observed after the surface has been rubbed ten times in a reciprocating manner under a frictional load of 1 kg/cm$^2$ using #0000 steel wool.

The optical layered body of the present invention preferably has a total light transmittance of 90% or higher. In the case that the optical layered body is mounted on the display surface, a total light transmittance of lower than 90% may decrease the color reproducibility and visibility, and may not lead to the desired contrast. The total light transmittance is more preferably 91% or higher.

The total light transmittance can be measured by the method based on JIS K-7361 using a haze meter (product of Murakami Color Research Laboratory, product number: HM-150).

The optical layered body of the present invention preferably has a haze of 1% or lower. A haze of higher than 1% may not lead to the desired optical properties, decreasing the visibility in the case that the optical layered body of the present invention is mounted on the image display surface. The haze is preferably 0.6% or lower, and more preferably 0.4% or lower.

The haze can be measured by the method based on JIS K-7136 using a haze meter (product of Murakami Color Research Laboratory, product number: HM-150).

The optical layered body of the present invention can be produced by forming a hard coat layer from a hard coat layer composition, on a triacetyl cellulose substrate.

The materials constituting the hard coat layer composition and the method of forming the hard coat layer may respectively be the same materials and method as those described above for formation of a hard coat layer.

The optical layered body of the present invention, as described above, has a hard coat layer formed from the hard coat layer composition that contains a specific (meth)acrylic polymer, a polyfunctional monomer, and a lubricant. The optical layered body of the present invention is therefore prevented from being curled, damaged, and stuck to other optical layered bodies, and has a high pencil hardness, excellent abrasion resistance, and excellent optical properties. Also, the optical layered body can be prevented from having trace of a marking when the optical layered body has a protective film on its hard coat layer, and is irradiated with ultraviolet light through the protective film. The optical layered body also has excellent adhesion between the hard coat layer and the substrate.

Another aspect of the present invention is a polarizer including a polarizing element, and the optical layered body of the present invention that is arranged on the surface of the polarizing element by a method such as attaching the triacetyl cellulose substrate of the optical layered body to the surface of the polarizing element.

The polarizing element may be any material such as a polyvinyl alcohol film, a polyvinyl formal film, a polyvinyl acetal film, and an ethylene-vinyl acetate copolymer saponified film which have been dyed with iodine or the like, and stretched. In laminating the polarizing element and the optical layered body of the present invention, the triacetyl cellulose substrate is preferably subjected to saponification. The saponification increases the adhesion, and also provides an antistatic effect.

The polarizer may further have a protective film on the hard coat layer of the optical layered body.

The protective film may be any protective film commonly known in the field of optical layered bodies.

The polarizer of the present invention does not have trace of a marking after the optical layered body has been irradiated with UV light through the protective film to be processed to form a polarizer, in the case that the protective film has a marking such as a lot number on its surface.

Another aspect of the present invention is an image display device including, on its outermost surface, the optical layered body or the polarizer. The image display device may be an image display device such as an LCD, PDP, FED, ELD (organic EL, inorganic EL), CRT, touch panel, electronic paper, and tablet PC.

An LCD, which is a representative example of the image display device, includes a transparent display and a lighting system for irradiating the transparent display from the back. In the case that the image display device of the present invention is an LCD, the image display device has the optical layered body of the present invention or the polarizer of the present invention on the surface of the transparent display.

In the case that the liquid crystal display device of the present invention has the optical layered body, the optical layered body is irradiated by the light source of the lighting system from its bottom side (substrate side). An STN liquid crystal display device may have a retardation plate between a liquid crystal display element and a polarizer. The liquid crystal display device may optionally have an adhesive layer between one layer and the next.

A PDP, which is an example of the image display device, has a front glass substrate, a back glass substrate facing the front glass substrate, and discharge gas enclosed between the substrates. In the case that the image display device of the present invention is a PDP, the display device has the above-described optical layered body on the surface of the front glass substrate or the front plate (glass substrate or film substrate) of the front glass substrate.

The image display device may be another image display device such as an ELD device configured to provide display by controlling the voltage applied to the glass substrate on which zinc sulfide or a diamine substance which emits light under voltage, i.e., a light-emitting material, is deposited; or a CRT configured to convert electric signals into light and produce images that are visible to human eyes. In this case, each of the above display devices has the above optical layered body, on its outermost surface or on the surface of the front plate.

In any case, the optical layered body of the present invention can be used for display on televisions and computers. Particularly, the optical layered body of the present invention can be suitable for use on the surface of a high definition image display, such as CRTs, liquid crystal panels, PDPs, ELDs, FEDs, touch panels, electronic paper, and tablet PCs.

Advantageous Effects of Invention

The optical layered body of the present invention has the above structure, and thus has excellent blocking resistance and is prevented from sticking to another optical layered body. Since the hard coat layer is a specific cured resin article, the hard coat layer is prevented from being curled and damaged, has a high pencil hardness, excellent abrasion resistance, and excellent optical properties. Also, the hard coat layer can be prevented from having trace of a marking when irradiated with UV light through a protective film having a marking so as to be processed to form a polarizer.

The optical layered body of the present invention can be particularly suitable for high definition displays such as cathode ray tube (CRT) displays, liquid crystal displays (LCD), plasma displays (PDP), electroluminescence displays (ELD), field emission displays (FED), touch panels, electronic paper, and tablet PCs.

DESCRIPTION OF EMBODIMENTS

Figure 1:
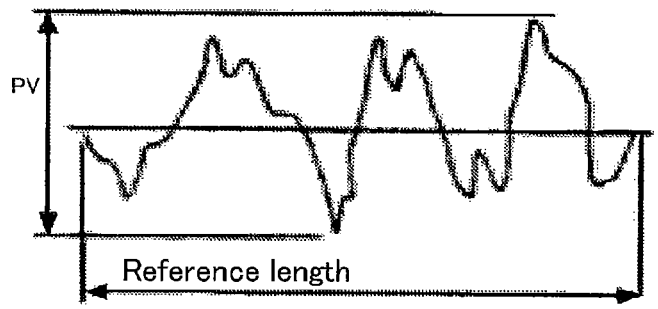
FIG. 1 is an explanatory view of a maximum height (PV height).
Figure 2:
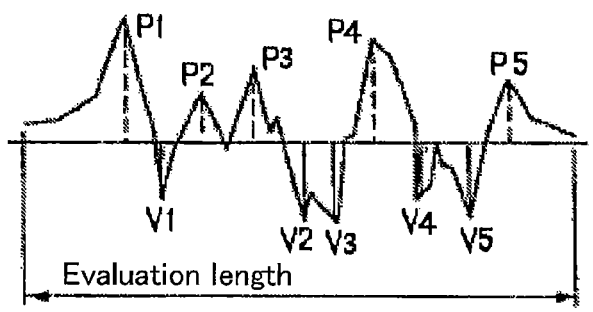
FIG. 2 is an explanatory view of the measurement method of a ten-point average roughness Rz.
Figure 3:
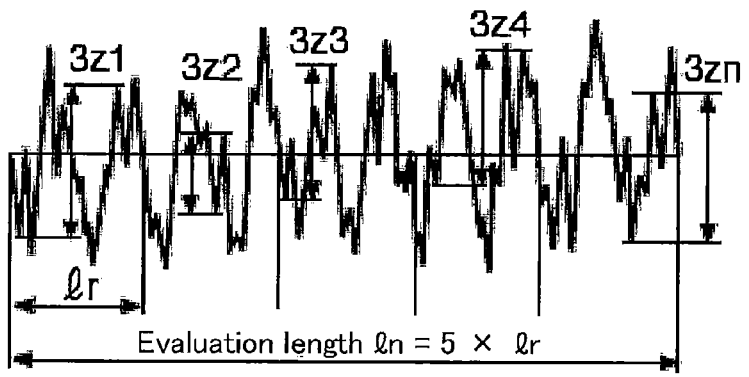
FIG. 3 is an explanatory view of the measurement method of the base roughness depth R3z.

The present invention is described in more detail below with reference to examples which, however, are not intended to limit the scope of the present invention.
In the following, "part(s)" and "%" are units based on mass, unless otherwise specified.

Example 1

An amount of 4 parts by mass of IRGACURE 184 (product of Ciba Specialty Chemicals) was dissolved in methyl isobutyl ketone to a final solids content of 35% by mass. The solution obtained was mixed with 80 parts by mass (solids content) of PETA and 20 parts by mass (solids content) of an acrylic polymer (Tg=50° C., Mw=19,000, acid number=0.8, amount of acrylic double bonds=230, hydroxyl value in solids content=146) to a final solids content of 35% by mass, and the solution was stirred.
To the resulting solution was added 0.2 parts by mass (solids content) of a leveling agent (product name: Defensa MCF-350-5, product of DIC), and the solution was stirred. The solution was further mixed with 1 part by mass (solids content) of a lubricant (product name: SIRMIBK15WT %-E65, silica particle dispersion, product of CIK NanoTek Corporation), and the solution was stirred. Thereby, a hard coat layer composition was obtained.
The obtained hard coat layer composition was applied to a triacetyl cellulose (TAC) substrate (product name: KC8UX2M, thickness: 80 μm, product of Konica Minolta Opto Products, Co., Ltd.) by slit reverse die coating, with an application amount of 10 g/m$^2$. As a result, a coating film was formed. The coating film obtained was dried at 70° C. for one minute, and then irradiated with UV light for curing with an ultraviolet irradiation amount of 150 mJ/cm$^2$, so that a hard coat layer was formed. Thereby, an optical layered body of Example 1 was obtained.

Examples 2 to 8, Comparative Examples 1 to 7, Reference Example 1

A hard coat layer was formed on a TAC substrate and an optical layered body was obtained in the same manner as in Example 1, except that the (meth)acrylic polymer, the solvent, the ratio (mass ratio) of the solvent, and the lubricant for the hard coat layer composition were changed as shown in Table 1. The styrene-acrylic particles shown in Table 1 were Aica Aitron 2732 from Aica Kogyo Company, Limited.
The obtained optical layered body was evaluated for the following items. Table 2 shows the evaluation results.

<Blocking Resistance>
Two optical layered bodies were prepared for each of a large size (e.g. A4 size) and a size larger than the large size. The two bodies are sandwiched by hands such that the hard coat layers of the bodies come into contact with each other, and the bodies are strongly rubbed against each other by the palms of the hands. The lubricity of the optical layered bodies of each size was evaluated by rubbing their hard coat layers against each other. The optical layered bodies were evaluated as "Excellent" if they had favorable lubricity, "Good" if they had moderate lubricity, "Acceptable" if they had slight lubricity, and "Poor" if they did not have lubricity.

<Trace of Marking>
A polyethylene protective film having a marking (made using, for example, a permanent marker) was attached to the optical layered body obtained. The resulting optical layered body was irradiated with ultraviolet light (amount of light: 4800 mJ/cm$^2$) from the protective film side, without N$_2$ substitution. After the irradiation, the protective film was removed so that the hard coat layer surface was visually observed under the fluorescent lamp. The optical layered body was evaluated as "Poor" if it had a visible trace of the marking, and "Good" if it had no visible trace of the marking.

Figure 4:
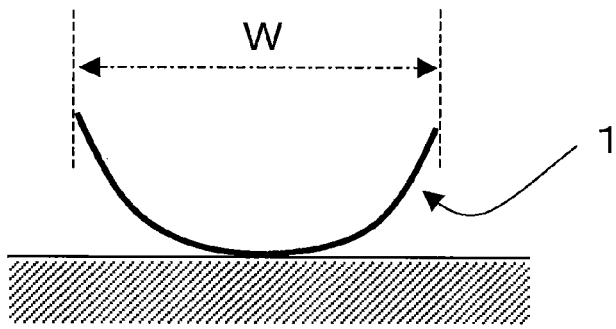
FIG. 4 is a schematic cross-sectional view illustrating the evaluation method of curling of an optical layered body.

<Curling>
The obtained optical layered body was cut into a size of 10 cm×10 cm. The width (W) of the curling of the optical layered body was measured with the coating surface faced up as illustrated in FIG. 4. The optical layered body was evaluated as "Good" if its width of curling was 90 mm or greater, and "Poor" if its width of curling was smaller than 90 mm.

<Damage>
The level of damage (heat wrinkles) in the flow direction of the substrate, produced through curing reaction by UV irradiation for the hard coat layer formation, was visually observed under a fluorescent lamp. The optical layered body was evaluated as "Poor" if it had apparent wavy wrinkles, and "Good" if it had almost no wrinkles.

<Pencil Hardness>
The moisture content of each optical layered body was controlled at a temperature of 25° C. and a relative humidity of 60% for two hours. With a test pencil (hardness: HB to 3H) specified in JIS-S-6006, the pencil hardness of the surface of the optical layered body covered by the hard coat layer was measured under a load of 4.9 N, in accordance with the pencil hardness evaluation method defined in JIS K5600-5-4 (1999).

<Abrasion Resistance (Steel Wool (SW) Resistance)>
The hard coat layer surface of each optical layered body was rubbed ten times in a reciprocating manner under a frictional load of 1 kg/cm$^2$ using #0000 steel wool. The coating film was visually observed for peeling, and the optical layered body was evaluated based on the following criteria.
Good: Not damaged (no peeling of the coating film was observed)
Poor: Damaged (peeling of the coating film was observed)

<Haze>
The total light transmittance and haze of each optical layered body was measured by the method based on JIS K-7136 (haze) using a haze meter (product of Murakami Color Research Laboratory, product number: HM-150).

<Whiteness of Coating Film>
Using a three-wavelength tube, each optical layered body was visually observed from the hard coat layer side in a dark room, so that the whiteness of the hard coat layer was determined in terms of the transparency and reflection. Also, black tape was attached to the back (TAC substrate side surface) of each optical layered body, and the whiteness of the hard coat layer was visually observed using a three-wavelength tube in a dark room in the same manner as above. The coating film was evaluated based on the following criteria.

Good: Film showed no whiteness and showed transparency in both tests.

Acceptable: Film showed slight whiteness in at least one of the tests, which, however, does not cause a problem.

Poor: Film showed whiteness in at least one of the tests.

<Rtm, Rz, and R3z>

Rtm, Rz, and R3z of each optical layered body were measured using a non-contact surface measurement system (product of Zygo Corporation). Table 3 shows the results. The unit in Table 3 is nm.

(Measurement Condition)

Each optical layered body was placed on a glass plate, and observed using a 10× zoom lens at a zoom factor of 2. The Rtm, Rz, and R3z were determined from the Roughness/Waviness Map, which is displayed when the "Measure" button is pressed, in the Advanced Texture Application of the non-contact surface measurement system.

TABLE 1

|  | Example 1 | Example 2 | Example 3 | Example 4 | Example 5 | Example 6 | Example 7 | Example 8 |
|---|---|---|---|---|---|---|---|---|
| Hydroxyl value in solids content | 146 | 86 | 148 | 88 | 88 | 88 | 225 | 146 |
| Acrylic double bond equivalent | 230 | 218 | 228 | 213 | 213 | 213 | 250 | 230 |
| Weight average molecular weight | 19000 | 20000 | 19000 | 20000 | 20000 | 20000 | 18000 | 19000 |
| Tg (° C.) | 50 | 50 | 50 | 50 | 50 | 50 | 50 | 50 |
| Acid value (mgKOH/g) | 0.8 | 0.7 | 0.6 | 0.7 | 0.7 | 0.7 | 0.8 | 0.8 |
| Viscosity (mPa · s) | 1200 | 620 | 790 | 560 | 560 | 560 | 840 | 1200 |
| Solvent(s) used | MIBK | MIBK | MIBK | MIBK | MIBK/methyl acetate | MIBK/MEK | MIBK/MEK | MIBK |
| Ratio of solvent(s) used | 100% | 100% | 100% | 100% | 70/30 | 30/70 | 30/70 | 100% |
| Lubricant | Si | Si | Si | Si | Si | Styrene-acrylic particles | Si | Si |
| PETA mixing ratio (parts by mass) | 80 | 80 | 80 | 80 | 80 | 80 | 80 | 90 |
| Polymer mixing ratio (parts by mass) | 20 | 20 | 20 | 20 | 20 | 20 | 20 | 10 |

|  | Comparative Example 1 | Comparative Example 2 | Comparative Example 3 | Comparative Example 4 | Comparative Example 5 | Comparative Example 6 | Comparative Example 7 | Reference Example 1 |
|---|---|---|---|---|---|---|---|---|
| Hydroxyl value in solids content | 190 | 160 | 225 | 88 | 225 | 88 | 146 | 146 |
| Acrylic double bond equivalent | 264 | 279 | 250 | 213 | 250 | 213 | 230 | 230 |
| Weight average molecular weight | 19000 | 20000 | 18000 | 20000 | 18000 | 20000 | 19000 | 19000 |
| Tg (° C.) | 50 | 50 | 50 | 50 | 50 | 50 | 50 | 50 |
| Acid value (mgKOH/g) | 12.3 | 23.5 | 0.8 | 0.7 | 0.8 | 0.7 | 0.8 | 0.8 |
| Viscosity (mPa · s) | 1700 | 2090 | 840 | 560 | 840 | 560 | 1200 | 1200 |
| Solvent(s) used | MIBK | MIBK | MIBK | MIBK/acetone | MIBK/methyl acetate | MIBK/MEK | MIBK | MIBK |
| Ratio of solvent(s) used | 100% | 100% | 100% | 50/50 | 90/10 | 20/80 | 100% | 100% |
| Lubricant | Si | Si | Si | Si | Si | Styrene-acrylic particles | Si | Si |
| PETA mixing ratio (parts by mass) | 80 | 80 | 80 | 80 | 80 | 80 | 65 | 95 |
| Polymer mixing ratio (parts by mass) | 20 | 20 | 20 | 20 | 20 | 20 | 35 | 5 |

TABLE 2

|  | Example 1 | Example 2 | Example 3 | Example 4 | Example 5 | Example 6 | Example 7 | Example 8 |
|---|---|---|---|---|---|---|---|---|
| Blocking resistance | Good | Excellent | Good | Excellent | Excellent | Excellent | Excellent | Good |
| Trace of marking | Good | Good | Good | Good | Good | Good | Good | Good |
| Curling | Good | Good | Good | Good | Good | Good | Good | Good |
| Damage | Good | Good | Good | Good | Good | Good | Good | Good |
| Pencil hardness | 2H | 2H | 2H | 2H | 2H | 2H | 2H | 2H |
| Abrasion resistance | Good | Good | Good | Good | Good | Good | Good | Good |
| Haze (%) | 0.3 | 0.3 | 0.3 | 0.3 | 0.3 | 0.3 | 0.3 | 0.3 |
| Coating film whiteness | Good | Good | Good | Good | Good | Acceptable | Good | Good |

TABLE 2-continued

|  | Comparative Example 1 | Comparative Example 2 | Comparative Example 3 | Comparative Example 4 | Comparative Example 5 | Comparative Example 6 | Comparative Example 7 | Reference Example 1 |
|---|---|---|---|---|---|---|---|---|
| Blocking resistance | Poor | Poor | Acceptable | Excellent | Acceptable | Excellent | Acceptable | Good |
| Trace of marking | Good | Good | Good | Good | Good | Good | Good | Good |
| Curling | Good | Good | Good | Good | Good | Good | Good | Poor |
| Damage | Good | Good | Good | Good | Good | Good | Good | Poor |
| Pencil hardness | 2H | 2H | 2H | 2H | 2H | 2H | 2H | 2H |
| Abrasion resistance | Good | Good | Good | Good | Good | Good | Poor | Good |
| Haze (%) | 0.3 | 0.3 | 0.3 | 3 | 0.3 | 1 | 0.3 | 0.3 |
| Coating film whiteness | Good | Good | Good | Poor | Good | Poor | Good | Good |

TABLE 3

|  | Example 1 | Example 2 | Example 3 | Example 4 | Example 5 | Example 6 | Example 7 | Example 8 |
|---|---|---|---|---|---|---|---|---|
| Rtm | 2.65 | 2.94 | 2.26 | 3.00 | 2.83 | 11.1 | 2.77 | 2.81 |
| R3z | 2.99 | 3.26 | 2.53 | 3.03 | 3.08 | 13.1 | 2.85 | 3.15 |
| Rz | 3.25 | 3.64 | 2.69 | 3.76 | 3.20 | 13.5 | 3.06 | 3.58 |

|  | Comparative Example 1 | Comparative Example 2 | Comparative Example 3 | Comparative Example 4 | Comparative Example 5 | Comparative Example 6 | Comparative Example 7 | Reference Example 1 |
|---|---|---|---|---|---|---|---|---|
| Rtm | 2.02 | 2.42 | 1.98 | 17.8 | 3.24 | 11.5 | 2.25 | 3.02 |
| R3z | 2.06 | 2.34 | 1.99 | 22.1 | 2.87 | 13.5 | 2.44 | 3.11 |
| Rz | 2.37 | 2.45 | 2.07 | 23.7 | 4.21 | 14.0 | 2.59 | 3.34 |

As shown in Table 2, the optical layered body of the present invention has excellent blocking resistance. Also, the optical layered body is excellent in pencil hardness, abrasion resistance, and optical properties, has no trace of the marking, and causes no curling or damage. In contrast, none of the optical layered bodies of the comparative examples showed favorable results in all the items. Since the optical layered body of Reference Example 1 contained a very small amount of the polyfunctional monomer relative to the amount of the (meth)acrylic polymer, the optical layered body showed inferior results in the curling and damage evaluations. Although not shown in Table 2, Examples 1 to 4 employed MIBK as a solvent, and Examples 5 to 7 employed a combination of MIBK and methyl acetate or MEK as a solvent, and thus showed excellent interference fringe resistance on the hard coat layer surface.

INDUSTRIAL APPLICABILITY

The optical layered body of the present invention can be particularly suitable for high definition displays such as cathode ray tube (CRT) displays, liquid crystal displays (LCD), plasma displays (PDP), electroluminescence displays (ELD), field emission displays (FED), touch panels, electronic paper, and tablet PCs.

REFERENCE SIGNS LIST

1 Optical layered body

The invention claimed is:
1. An optical layered body comprising
a triacetyl cellulose substrate and
a hard coat layer,
wherein the hard coat layer has fine surface roughness
the fine surface roughness has an average PV roughness Rtm of 2.2 to 11.5 nm, a base roughness depth R3z of 2.5 to 13.5 nm, and a ten-point mean roughness Rz of 2.6 to 13.5 nm, and satisfies the relation Rtm<R3zRz.

2. The optical layered body according to claim 1, wherein the hard coat layer contains a lubricant, and the fine roughness of the hard coat layer are shaped by the lubricant.

3. The optical layered body according to claim 2, wherein the hard coat layer is a cured product of a hard coat layer composition that contains a (meth)acrylic polymer, a polyfunctional monomer, and a lubricant, and the (meth)acrylic polymer has an acryloyl side chain, and has a hydroxyl value in a solids content of 150 or lower.

4. The optical layered body according to claim 2, wherein the hard coat layer is a cured product of a hard coat layer composition that contains a (meth)acrylic polymer which has a weight average molecular weight of 10,000 to 30,000, and has an acrylic double bond equivalent of 300 or less.

5. The optical layered body according to claim 2, wherein the hard coat layer is a cured product of a hard coat layer composition that contains pentaerythritol tri(meth)acrylate.

6. The optical layered body according to claim 2, wherein the hard coat layer is a cured product of a hard coat layer composition that contains a (meth)acrylic polymer and a polyfunctional monomer, and has a solid content ratio by mass of the (meth)acrylic polymer to the polyfunctional monomer of 1/9 to 3/7.

7. The optical layered body according to claim 2,
wherein the lubricant is at least one selected from the group consisting of silica particles and styrene-acrylic particles.

8. The optical layered body according to claim 7, wherein the hard coat layer is a cured product of a hard coat layer composition that contains a (meth)acrylic polymer, a polyfunctional monomer, and a lubricant, and the (meth)acrylic polymer has an acryloyl side chain, and has a hydroxyl value in a solids content of 150 or lower.

9. The optical layered body according to claim 7, wherein the hard coat layer is a cured product of a hard coat layer composition that contains a (meth)acrylic polymer which has a weight average molecular weight of 10,000 to 30,000, and has an acrylic double bond equivalent of 300 or less.

10. Currently Amended) The optical layered body according to claim 7, wherein the hard coat layer is a cured product of a hard coat layer composition that contains pentaerythritol tri(meth)acrylate.

11. The optical layered body according to claim 7, wherein the hard coat layer is a cured product of a hard coat layer composition that contains a (meth)acrylic polymer and a polyfunctional monomer, and has a solid content ratio by mass of the (meth)acrylic polymer to the polyfunctional monomer of 1/9 to 3/7.

12. The optical layered body according to claim 1,
wherein the hard coat layer is a cured product of a hard coat layer composition that contains a (meth)acrylic polymer, a polyfunctional monomer, and a lubricant, and
the (meth)acrylic polymer has an acryloyl side chain, and has a hydroxyl value in a solids content of 150 or lower.

13. The optical layered body according to claim 12, wherein the hard coat layer is a cured product of a hard coat layer composition that contains a (meth)acrylic polymer which has a weight average molecular weight of 10,000 to 30,000, and has an acrylic double bond equivalent of 300 or less.

14. The optical layered body according to claim 12, wherein the hard coat layer is a cured product of a hard coat layer composition that contains pentaerythritol tri(meth)acrylate.

15. The optical layered body according to claim 1,
wherein the hard coat layer is a cured product of a hard coat layer composition that contains a (meth)acrylic polymer which has a weight average molecular weight of 10,000 to 30,000, and has an acrylic double bond equivalent of 300 or less.

16. The optical layered body according to claim 15, wherein the hard coat layer is a cured product of a hard coat layer composition that contains pentaerythritol tri(meth)acrylate.

17. The optical layered body according to claim 1,
wherein the hard coat layer is a cured product of a hard coat layer composition that contains pentaerythritol tri(meth)acrylate.

18. The optical layered body according to claim 1,
wherein the hard coat layer is a cured product of a hard coat layer composition that contains a (meth)acrylic polymer and a polyfunctional monomer, and has a solid content ratio by mass of the (meth)acrylic polymer to the polyfunctional monomer of 1/9 to 3/7.

19. A polarizer comprising a polarizing element and the optical layered body according to claim 1, which is arranged on a surface of the polarizing element.

20. An image display device comprising
an optical layered body which comprises a triacetyl cellulose substrate and a hard coat layer, wherein the hard coat layer has fine surface roughness the fine surface roughness has an average PV roughness Rtm of 2.2 to 11.5 nm, a base roughness depth R3z of 2.5 to 13.5 nm, and a ten-point mean roughness Rz of 2.6 to 13.5 nm, and satisfies the relation Rtm<R3zRz or
a polarizer comprising
a polarizing element and
an optical layered body
which comprises a triacetyl cellulose substrate and a hard coat layer, wherein the hard coat layer has fine surface roughness the fine surface roughness has an average PV roughness Rtm of 2.2 to 11.5 nm, a base roughness depth R3z of 2.5 to 13.5 nm, and a ten-point mean roughness Rz of 2.6 to 13.5 nm, and satisfies the relation Rtm<R3zRz, and wherein the hard coat layer is arranged on an outermost surface of the polarizing element.

* * * * *

UNITED STATES PATENT AND TRADEMARK OFFICE
CERTIFICATE OF CORRECTION

PATENT NO.         : 9,097,844 B2
APPLICATION NO.    : 13/819270
DATED              : August 4, 2015
INVENTOR(S)        : Masayuki Tsunekawa et al.

It is certified that error appears in the above-identified patent and that said Letters Patent is hereby corrected as shown below:

In the Claims:

At column 15, claim number 1, line number 67, "$Rtm<R3zRz$" should read
--$Rtm<R3z\leq Rz$--;

At column 18, claim number 20, line number 22, "$Rtm<R3zRz$" should read
--$Rtm<R3z\leq Rz$--; and At column 18, claim number 20, line number 31, "$Rtm<R3zRz$" should read
--$Rtm<R3z\leq Rz$--.

Signed and Sealed this
Ninth Day of February, 2016

Michelle K. Lee
*Director of the United States Patent and Trademark Office*